Patented Dec. 23, 1941

2,266,771

UNITED STATES PATENT OFFICE 2,266,771

ACYLOXY-ACRYLIC ACID NITRILES AND PROCESS OF PREPARING THEM

Heinrich Lange, Frankfort-on-the-Main-Hochst, and Herbert Kranz, Frankfort-on-the-Main-Nied, Germany, assignors, by mesne assignments, to General Aniline & Film Corporation, New York, N. Y., a corporation of Delaware No Drawing. Application July 29, 1939, Serial No. 287,248. In Germany August 27, 1938

7 Claims. (Cl. 260—464)

The present invention relates to acyloxy-acrylic acid nitriles and to a process of preparing them.

We have found that alpha-acyloxy-acrylic acid nitriles may be prepared with a good yield by causing a suitable base, for instance, a tertiary amine, to act upon an alpha-acyloxy-beta-halogen-propionitrile, if desired in the presence of a suitable solvent. It is surprising that neither the halogen is exchanged for another radical nor the acyl radical is split off as acid—as happens in similar cases—but that 1 mol of hydrogen halide is split off. The alpha-acyloxy-acrylic acid nitriles are obtained in a smooth reaction.

Suitable bases are primary, secondary and tertiary aliphatic amines such as monomethyl-, di-methyl- and tri-methyl amine, mono-ethyl-, diethyl- and triethyl amine, monobutyl-, dibutyl- and tributyl amine.

It is advisable to use at least a quantity of the base equimolecular to that of the alpha-acyloxy-beta-halogen-propionitrile.

The reaction is so smooth that it may be carried out at room temperature, but higher temperatures, for instance +50° C., may likewise be applied.

The reaction may generally be performed under atmospheric pressure. In case the amine applied is gaseous at the reaction temperature, an excess pressure may be applied.

As solvents for the starting materials there may, for instance, be used ether, benzene, toluene, xylene, furthermore petroleum hydrocarbons of high molecular weight.

The halogen in the starting materials may, for instance, be chlorine or bromine. As acyl-groups there may, for instance, be used the formyl-group, the acetyl-group, the propionyl-group, the butyryl-group, the isoheptyl-group, the crotonyl-group.

The alpha-acyloxy-acrylic acid nitriles are valuable intermediate products for the manufacture of artificial masses and pharmaceutical products. They have the general formula:

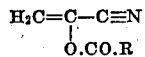

wherein R stands for hydrogen or an aliphatic hydrocarbon radical; especially valuable are those products in which the radical R contains at least 2 carbon atoms.

The following examples serve to illustrate the invention, but they are not intended to limit it thereto:

(1) A solution of 206 grams of triethylamine in 100 cc. of anhydrous ether is added, drop by drop, to a solution of 295 grams of alpha-acetoxy-beta-chloro-propionitrile in 2000 cc. of anhydrous ether. Triethylamino-hydrochloride is thus precipitated; it is filtered and may be reconverted into the free base in known manner. The filtrate is distilled whereby there are thus obtained at 80° C. to 81.5° C. under a mercury pressure of 30 mm. 147.3 grams of alpha-acetoxy-acrylic acid nitrile. The yield amounts to 66.5 per cent of the theoretical.

(2) A solution of 121,2 grams of alpha-propionyl-oxy-beta-chloro-propionitrile in 500 cc. of ether is added, drop by drop while vigorously stirring, at 20° C. to a solution of 75 grams of triethylamine in 150 cc. of anhydrous ether. Thereafter the mixture is further stirred for 2 hours and then filtered. The salt remaining on the filter is still twice stirred together with ether and filtered. The combined filtrates are concentrated and the separated salt precipitated is separated. By distillation there are obtained under a mercury pressure of 9.5 mm. 71 grams of alpha-propionyloxy-acrylic acid nitrile of boiling point 66° C. to 67° C.

(3) 87.8 grams of alpha-butyryloxy-beta-chloro-propionitrile are dissolved in 500 cc. of ether. In the course of 2 hours, at a temperature of 20° C. to 30° C. this solution is added, drop by drop while stirring, to a solution of 50.5 grams of triethylamine in 150 cc. of ether. After the whole quantity has been introduced, the mixture is further stirred for ¼ hour and then worked up as described in Example 2. There are obtained 39.5 grams of alpha-butyryloxy-acrylic acid nitrile boiling at 63° C. to 65° C. under a mercury pressure of 3.5 mm.

(4) A solution of 36 grams of diethylamine in 150 cc. of ether is added, drop by drop while stirring, at 20° C. to a solution of 74 grams of alpha-acetoxy-beta-chloro-propionitrile in 150 cc. of ether. The diethylaminohydrochloride precipitated is stirred together with ether and filtered. The combined filtrates are distilled. The yield of alpha-acetoxy-acrylic acid nitrile amounts to 75 per cent of the theoretical.

(5) A solution of 29 grams of trimethylamine in 150 cc. of ether is added, drop by drop, to a solution of 74 grams of alpha-acetoxy-beta-chloro-propionitrile in 150 cc. of ether. The trimethylaminohydrochloride precipitated is stirred together with ether and filtered. The combined filtrates are distilled. The yield of alpha-acetoxy-acrylic acid nitrile amounts to 59 per cent of the theoretical.

(6) 92 grams of tri-n-butylamine dissolved in 150 cc. of ether are added, drop by drop, at 20° C. to a solution of 74 grams of alpha-acetoxy-beta-chloro-propionitrile. The tri-n-butylaminohydrochloride precipitated is stirred together with ether and filtered. The combined filtrates are distilled. The yield of alpha-acetoxy-acrylic acid nitrile amounts to 61 per cent of the theoretical.

We claim:

1. The process which comprises causing an aliphatic amine to act upon an alpha-acyloxy-beta-halogen-propionitrile in the presence of an inert organic solvent for the starting materials.

2. The process which comprises causing an aliphatic amine to act upon about an equimolecular quantity of an alpha-acyloxy-beta-halogen-propionitrile in the presence of an inert organic solvent for the starting materials.

3. The process which comprises causing an aliphatic tertiary amine to act upon about an equimolecular quantity of an alpha-acyloxy-beta-halogen-propionitrile in the presence of an inert organic solvent for the starting materials.

4. The process which comprises causing trimethylamine to act upon about an equimolecular quantity of alpha-acetyl-oxy-beta-chloro-propionitrile at room temperature in the presence of ether.

5. The process which comprises causing triethylamine to act upon about an equimolecular quantity of alpha-acetyl-oxy-beta-chloro-propionitrile at room temperature in the presence of ether.

6. The process which comprises causing tri-n-butylamine to act upon about an equimolecular quantity of alpha-acetyloxy-beta-chloro-propionitrile at room temperature in the presence of ether.

7. The alpha-butyryloxy-acrylic acid nitrile.

HEINRICH LANGE.
HERBERT KRANZ.